INVENTORS
M.P. BUDNEY,
H.S. BUDNEY,
T.W. BUDNEY &
M.F. SACZAWA

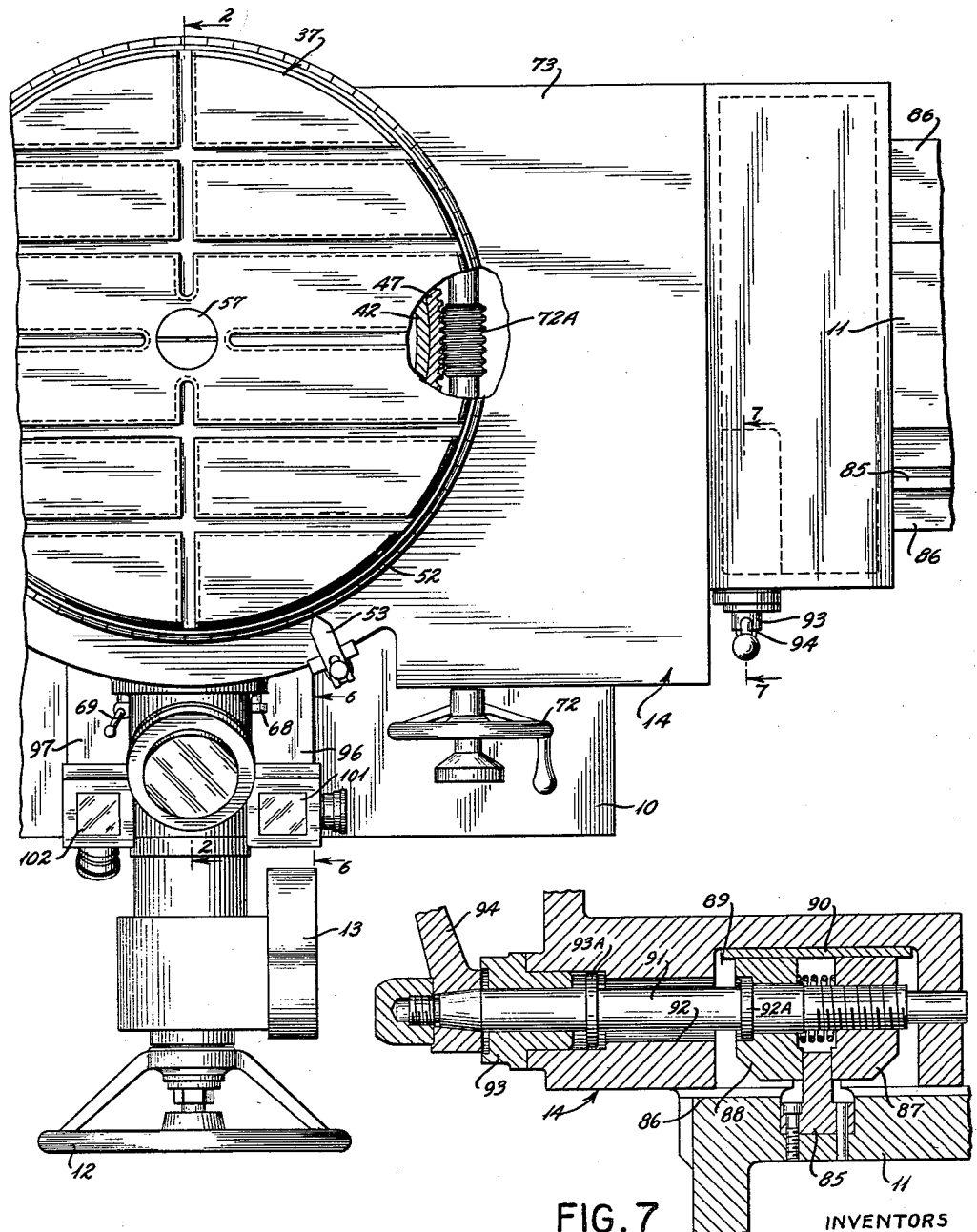

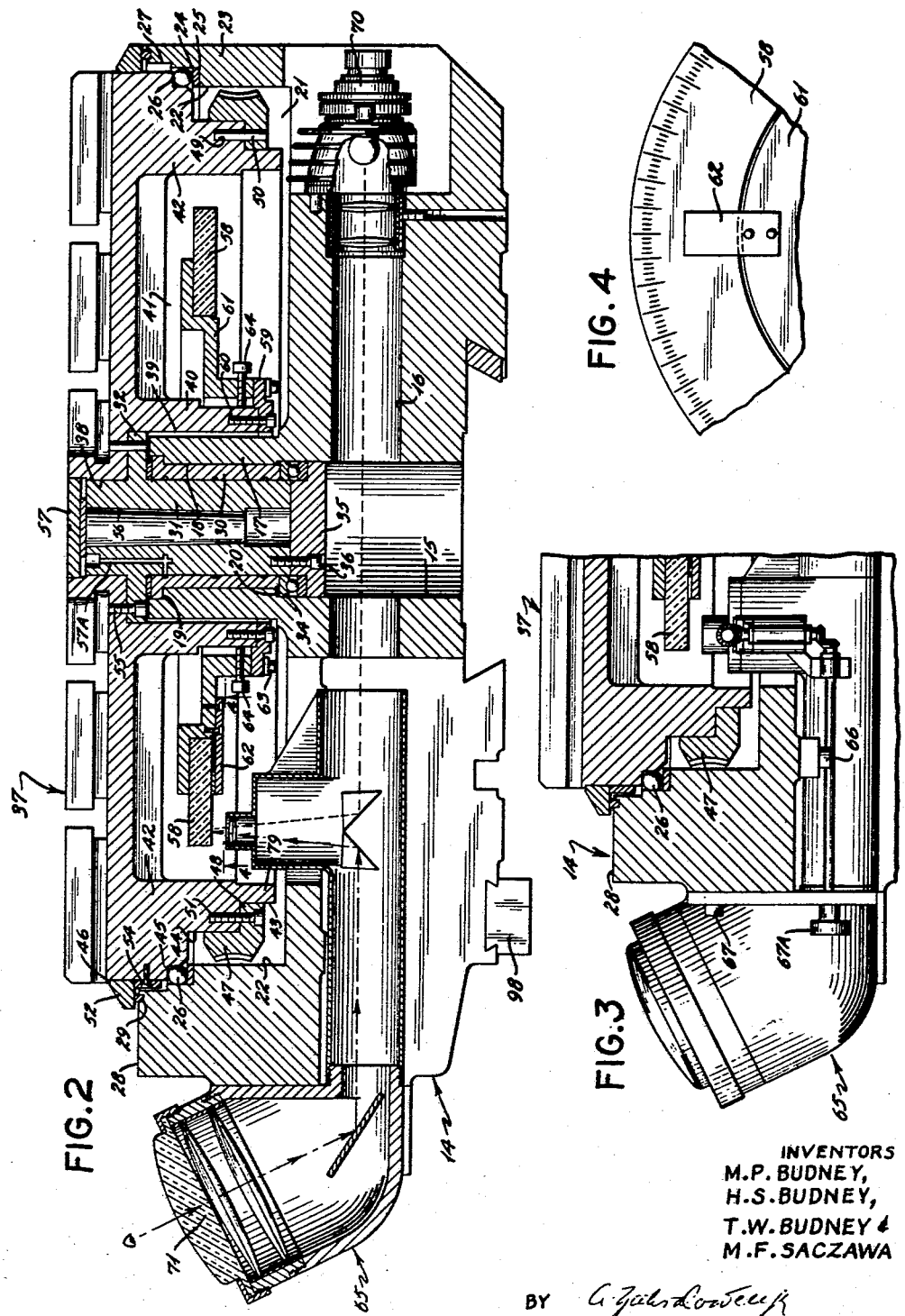

BY *[signature]*

ATTORNEY

United States Patent Office 3,083,594
Patented Apr. 2, 1963

3,083,594
JIG BORE ROTARY TABLE
Michael P. Budney, Berlin, Henry S. Budney and Thaddeus W. Budney, Newington, and Matthew F. Saczawa, Wethersfield, Conn., assignors to Atlantic Machine Tool Works, Inc., Newington, Conn.
Filed May 4, 1960, Ser. No. 26,736
17 Claims. (Cl. 77—63)

The present invention relates to a rotary table for supporting work on a jig borer and more particularly to a rotary table providing maximum accuracy in the angular positioning thereof.

Heretofore, rotary tables have been used for supporting work so that the angularity of the work relative to a reference index could be accurately determined whereby elements in angular relation could be positioned with sufficient accuracy for the final product, but the rotary tables heretofore known have not been equipped with sufficiently accurate scales nor with adequate scale reading means to obtain the high degree of accuracy required in modern, high speed equipment where accuracy may be maintained greater than ten-thousandths of an inch and angular relations within two or three seconds are required.

An object of the present invention is to provide a rotary table for a jig borer which provides for longitudinal and transverse movement of the work, as well as locational movement of the work with extremely high accuracy in all positioning movements.

Another object is to provide an optical system for reading scales in which the scales will remain accurate and the readings can be readily made by the attendant with assurance that the degree of accuracy required is maintained.

A further object is to provide a supporting structure for a rotary table which provides for ease of rotation and assurance that the work is maintained in a definite plane during such rotation.

Figure 5:
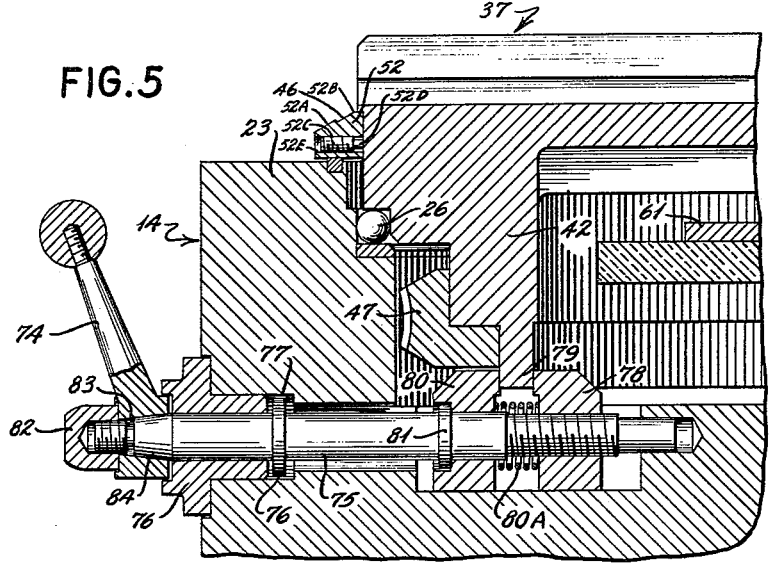
Figure 6:
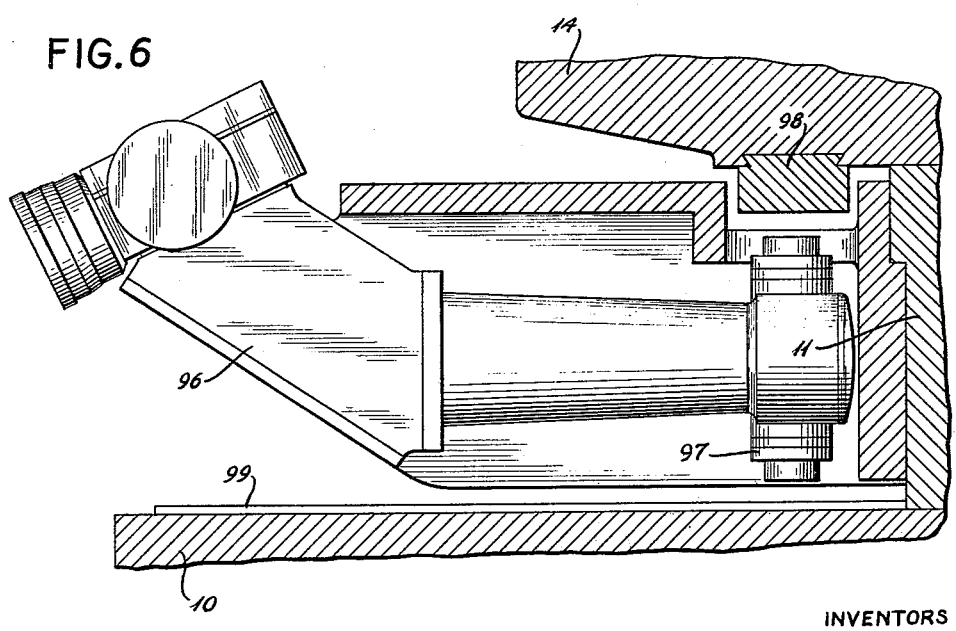

Other and further objects will be apparent as the description proceeds and upon reference to the accompanying drawings, wherein:

FIG. 1 is a fragmentary plan view of a rotary table mounted on the longitudinal slide, which in turn is mounted on the transverse slide, which transverse slide is mounted on the base;

FIG. 2, a fragmentary section taken substantially on the line 2—2 of FIG. 1, showing the optical arrangement for reading the rotary scale on the rotary table and showing the pivot arrangement for the rotary table;

FIG. 3, a fragmentary sectional view of an adjusting means for the cooperating portions of the optical arrangement;

FIG. 4, a fragmentary bottom view showing a fragment of the circular scale for measuring an angular position and the supporting straps for the scale;

FIG. 5, an enlarged fragmentary vertical section taken on a radial line of FIG. 1, showing the clamping arrangement for accurately maintaining the rotary table in an angular adjustment without displacing strains thereon;

FIG. 6, a fragmentary section taken substantially on the line 6—6 of FIG. 1, showing one of the scale reading devices for reading the rectilinear position of the longitudinally movable slide; and FIG. 7, a fragmentary section taken on line 7—7 of FIG. 1 showing the clamping arrangement to lock the longitudinal slide in any adjusted position.

Briefly, the present invention comprises a jig borer having a base with a transversely extending guideway on which a transverse slide is adjustably mounted and on the transverse slide a longitudinally movable slide is mounted in cooperating ways with suitable means for adjusting the position thereof. On the longitudinal slide a rotary table for supporting work is mounted for rotary movement about a vertical axis with the pivot structure being such that a clear transverse passage is provided in the longitudinal slide beneath the rotary table for the passage of light. Within an angular recess in the bottom of the rotary table a circular scale is mounted which is illuminated by a lamp at one end of the transverse passage and the scale is read by a scale reading device on the other end of the transverse passage, thereby providing for great accuracy and for protection of the entire scale reading device and the scale, thus avoiding all possibility of damage or displacement of the parts and assuring continuing accuracy with little or no servicing.

Referring more particularly to the drawings, on a base 10 having the usual transverse guideways a transversely movable slide 11 is mounted and is under the control of the usual transverse adjustment hand wheel 12. The transverse slide is also operable by a motor and a transmission 13 with the motor suspended below the axis of the hand wheel 12. Upon the transverse slide 11 a longitudinal slide 14 is mounted on longitudinal cooperating ways on the transverse slide and on the longitudinally movable slide. The longitudinal slide 14 is adjustable by means of any known means to produce the longitudinal movement.

The longitudinal slide is provided with a centrally extending upstanding bore 15 which is intersected by a transversely extending bore 16 for the unobstructed passage of light, the upstanding bore 15 extending upwardly through a central boss 17 in longitudinal slide 14 which has a bore 18 of smaller diameter than the bore 15 while being in alignment therewith, thereby providing upper and lower rabbets providing shoulders 19 and 20. The longitudinal slide 14 is provided with an upwardly opening annular chamber 21 formed in the body of the slide 14 and the outer periphery of such annular recess 21 is defined by the inner peripheral surface 22 of substantially uniform radius from the axis of aligned bores 15 and 18. For ease of explanation the peripheral wall defining the surface 22 is designated 23 and is provided with a bearing receiving rabbet 24 receiving a circular thrust washer track 25 supporting ball bearings 26. The wall 23 is provided with a second rabbet 27 extending to the top and the wall 23 terminates in a radial plane from the axis defining a surface 28 having a concentric seal groove receiving a seal 29.

A flanged bushing 30 is pressed into the reduced bore 18 with its flange abutting the top shoulder 19 and in such bushing an intermediately tubular externally flanged pivot member 31 is rotatably mounted with its flange 32 overlying the upper end of the hub 17 and the flange of bushing 30, a spacing thrust washer 33 being positioned between the flange of the bushing and the flange 32 of the pivot member. To maintain the pivot member 31 against axial movement while permitting rotation a thrust type antifriction bearing 34 is mounted on pivot member 31 with its upper race abutting the unflanged end of the bushing 30 while spaced from the shoulder 20. The lower race of bearing 34 is received in a circumferential rabbet in a cap 35 secured to the pivot member 30 by screws 36, thereby maintaining the pivot member 31 against axial displacement.

A one-piece rotary work supporting table 37 having a hub 40 is provided with a central bore 38 which receives the upper end of the pivot member 31, the hub 40 being provided with an enlarged central bore 39 receiving the boss 17 on the longitudinal slide 14. The hub portion 40 defines the inner periphery on an annular chamber 41 in the rotary table, the outer periphery being defined by an apron portion 42 which extends downwardly from the work supporting surface of the rotary table 37.

The apron portion 42 is provided with four circumferentially extending downwardly opening rabbets 43, 44, 45 and 46 on the outer periphery of the apron 42 designated from the bottom to the top respectively. Mounted in lower rabbets 43 and 44 is a ring-type worm gear 47 which has an inwardly projecting flange 48 received in the lowest rabbet 42 being positioned by means of a locating pin in aligned apertures 49 and 50 in the apron and in the flange, respectively, and secured by attaching screws 51 in aligned unthreaded apertures in the flange 48 and threaded apertures in the apron thereby securely mounting the ring worm gear in position.

The ball bearings 26 for supporting the periphery of the rotary table 37 are received in the rabbet 24 in the peripheral wall 23 of the longitudinal slide and in the rabbet 45 of the apron.

To conceal the annular space 21 between boss 17 and peripheral wall 23 in the longitudinal slide and annular space 41 in the rotary table between hub 40 and apron 42, a circular ring scale 52 is mounted on the top rabbet 46, such ring scale 52 being provided with suitable indicia to indicate degrees and parts of a degree and cooperating with a fixed index 53 mounted in a fixed position, on the longitudinal slide 14 to approximately indicate the angular position of the rotary table. The ring scale 52 is retained in the rabbet 46 by the lug elements 54 secured to the apron by suitable screws, space being provided for such lugs 54 by the circumferential rabbet 27 in the upstanding wall 23.

The ring scale 52 has a generally conical surface with one portion 52A having scale marks to indicate degrees while an undercut conical portion 52B has the numerals etched therein to indicate the numerical values of the lines of the scale on the portion 52A. The ring scale 52 is adjustably retained in position by a pair of set screws 52C sold under the trade name "No Mar" and such set screws are provided with a nylon tip 52D which engages the cylindrical surface of the rabbet 46.

The pair of set screws 52C are received in tapped radially extending bores 52E which are spaced apart from the zero degree mark by ten degrees so that such tapped bores and the set screws therein are spaced apart twenty degrees and such arrangement assures accurate positioning of the ring 52 in any desired adjusted position and the accurate reading of the minutes and seconds of angular measurement is made by the optical arrangement hereinafter described.

The inner portion of the rotary table 37 adjacent the central bore 38 overlies the flange 32 of the pivot member 31 and is secured thereto by screws 55, the position being determined by means of a pin passing through the aligned apertures in the central portion of the rotary table and the flange 32 to provide for accurate mounting on the pivot member to assure proper alignment and coaction of the bolts 55 which are loosely received in counterbored apertures in flange 32 and threaded into registering threaded apertures in the rotary table 37.

The pivot member 31 is provided with a tapered arbor receiving bore 56 which is closed at its upper end by a cap 57 threaded into a threaded upper bore of the table, a gasket element being provided to seal the bore, the cap 57 also providing access to a lubricant receiving passage 57A for the bushing 30 and pivot member 31.

Mounted in the annular chamber 41 of the rotary table is an accurately scribed circular angular measuring scale 58 which is supported from the lower end of the hub 41 by a circular plate 59 having an inner upwardly opening rabbet engaging the lower and outer peripheries of the hub 40 the plate being retained by fastening screws 60 threaded into the hub. The upper plane radial surface of such ring 59 supports a downwardly extending flange of a circular scale retaining support 61 which has a downwardly opening rabbet adjcent its outer periphery snugly receiving the scale 58, the scale 58 being held in the rabbet by means of a plurality of straps 62 underlying the scale and the central web of the support 61 and secured in place on the scale support 61 by suitable screws with a resilient scale-contacting element positioned between each such strap 62 and the scale 58.

The downwardly extending flange of the scale support 61 is secured to the circular plate 59 by cap screws 63 passing through enlarged apertures in the ring 59 and threaded into registering threaded apertures in the downwardly extending flange. The radial position of the scale support 61 and the scale 58 is the downwardly extending flange and the abutting hub 40 whereby suitable adjustment of the screws 44 the scale 58 is accurately centered about the axis of rotation of the rotary table.

A reading device for viewing the scale 58 comprises an assembly 65 secured to the slide 14 by bolts 66 extending upwardly through lugs in the reading device and threaded into longitudinal slide 14 and other bolts 67 extending laterally through a flange at the front of the viewing device and threaded into threaded apertures in the front of the longitudinal slide 14. The viewing device 65 includes an adjustable knob 67A and suitable gearing for obtaining a proper zero setting by moving the slide, carrying the zero index, tangentially of the circular-scale 58. A lever operated clamping mechanism operated by a lever 69 serves to maintain the zero adjustment. Light is provided to illuminate the screen by means of a lamp 70 positioned at the rear of the slide 14 in line with transversely extending bore 16 through suitable lenses, prisms or the like, illuminating the scale 58, whereby the scale can be read by means of the reading viewing device 65 on a screen 71 on the reading viewing device.

To rotate the table 37, a handwheel 72 is provided to operate a worm 72A which meshes with the worm gear 47 while an electric motor and suitable gearing is provided in the laterally extending portion 73 of the longitudinal slide 14 such handwheel and motor operation being similar to that shown in our copending application Serial No. 605,017, filed August 20, 1956.

This structure provides for either motor or manual rotary adjustment. An approximate angular reading can be determined by reading the exposed scale on ring 52 relative to the index 53 and the accurate reading can be made through the reading device 65.

To secure the rotary table in fixed position after a predetermined setting has been made, a manually operated clamp shown in FIGURE 5 is operated by hand lever 74 mounted on a radially extending clamp operating shaft 75 rotatable and axially movable in a flanged bushing 76 secured in an enlarged outer portion of a bore 77 in the longitudinally movable slide. The shaft 75 is provided with a first flange 76 positioned between the unflanged end of bushing 76 and a shoulder formed by the reduction in the bore 77. The inner end of the shaft 75 is provided with threads threaded into slidable jaw element 78 having a portion thereof engageable with the downwardly extending flange 79 formed by the rabbet 43. A second jaw 80 is provided with an unthreaded bore which slidably and rotatably receives the shaft 75 while a second flange 81 on the shaft 75 causes relative movement of the jaws 78 and 80 whereby rotation of the shaft causes relative movement of the jaws 78 and 80 to thereby clamp the flange 79 securely and locking the rotary table against rotation since the jaws 78 and 80 are accurately confined in guideways at their bottoms and the sides which prevent movement in a circumferential direction. The jaws 78 and 80 are separated by a compression spring 80A which assures opening the jaws when shaft 75 is rotated to open the jaws. The handle 74 is provided with a conical bore which receives the conical position 84 of the shaft 75 permitting relative angular adjustment of the handle 74 to shaft 75 and nut 82 secures the handle in any selected angular position since only a partial rotation of the shaft 75 in the proper direction is required to lock or release the rotary table.

To secure the longitudinally movable slide against longitudinal movement, an inverted T-shaped bar 85 is mounted between the supporting surface 86, 86 of the ways on the transverse side 11, such elongated inverted T-shaped bar being secured in position by bolts and adjusting pin and having the stem web portion thereof projecting above the ways 86 and lying between clamping jaw element 87 and having a threaded bore clamping jaw element having an unthreaded bore, the clamping jaws are received in a downwardly opening recess 89 in the longitudinal slide, the jaws being slidably mounted therein and being guided at their upper edges by a removable plate 90 and being guided by their lateral abutting surfaces defining the recess 89. A shaft 91 is received in a stepped bore 92 and has its inner end screw threaded into the thread bore in the jaw 87 while an enlarged portion of the shaft is slidably and rotatably received in the bore in the jaw 88, a flange 92A being received in a counter bore in the jaw 88 whereby rotation of the shaft 91 will cause movement of the jaws 87 and 88 together thereby clamping the web portion of the T-shaped bar 85 and maintaining the longitudinal slide 14 against longitudinal movement. The shaft 91 is rotatably mounted in a flanged bushing 93 while a handle 94 provides for rotation of the shaft 91 and thereby operation of the clamping jaws, the handle 94 being mounted by means of a conical recess on a conical end portion of the shaft 91 and secured in angular relation by a nut in a manner similar to that previously described.

Optical reading and viewing devices 96 and 97 are mounted on the transversely movable slide 10 for reading a scale 98 on the longitudinally movable slide and a scale 99 on the base 10, the readings of such scales being projected onto the screens 101, 102, respectively. Such reading devices are provided with lamp projectors to illuminate the portion of the scale being read and are also provided with suitable adjustment for obtaining the desired zero reading thereby making it possible to accurately locate the slides by reference to the scale readings.

The reading devices are purchased from Hilger and Watts, Ltd., and are attached to the transverse slides by suitable bolts and supporting brackets and the lamps are external to the slides to thereby avoid objectionable heating of parts of the machine.

From the above description it will be apparent that applicants have provided an accurate and positively movable structure to obtain maximum accuracy in the positioning of the longitudinal and transverse slides and the angular position of the work since the readings are dependent upon the actual positions of the slides and are not dependent upon the positions of operating elements therefor, the accuracy being markedly increased resulting in accuracies greater than .0001".

It will be obvious to one skilled in the art that various changes may be made in the invention without departing from the spirit and scope thereof and therefore the invention is not limited by that which is illustrated in the drawings and described in the specification, but only as indicated in the valid interpretation of the accompanying claims.

What is claimed is:

1. A jig borer having a base and transversely and longitudinally movable slides the improvement comprising an upstanding tubular boss projecting upwardly from said longitudinal slide and having rabbets at each end, said longitudinal slide having an upstanding peripheral wall having its inner periphery substantially concentric with said upstanding boss and projecting upwardly from said longitudinal slide, a flanged bearing sleeve mounted in the bore in said boss with the flange received in the upper rabbet with the lower end of said flanged sleeve projecting below the lower rabbet while being spaced a substantial distance above the bottom of the slide, an intermediately flanged pivot member rotatably mounted in said flanged bearing sleeve and having its flange extending outwardly beyond the periphery of the boss and overlying the flange of said bearing sleeve, a thrust washer between the flange of said bearing sleeve and the flange of said pivot member, a circular table having a downwardly extending hollow central hub telescopingly receiving the boss, said rotatable table having an inwardly extending central portion overlying and secured to the flange of said pivot member, said rotatable table having a downwardly extending apron substantially concentric with the hub and boss and lying within the peripheral wall of said slide, a thrust washer mounted on the lower end of said bearing sleeve and in the rabbet at the lower end of said boss and secured to the pivot member by a thrust-receiving cap thereby maintaining the rotary table against axial displacement, an annular ring worm gear mounted on said apron, a worm driving said worm gear and rotatably mounted in bearings in said longitudinal slide whereby said table may be rotated manually or by a motor operating said worm, cooperating rabbets on the upstanding peripheral wall and the periphery of the circular table, ball bearings cooperating with said rabbets for supporting the outer periphery of said circular table whereby said circular table will be completely supported at its center and its periphery.

2. The invention according to claim 1 in which a circular divided scale is fixedly secured to the hub of said table precisely concentric with the axis of rotation and positioned within the recess formed between said hub and said apron with the indicia thereof on the under surface, means to project light on said scale and means to project an image from said scale to a screen readily visible exteriorly of said slide, whereby an operator can precisely know the angular position of the rotary table.

3. The invention according to claim 1 in which an annular mounting plate is fixed to the free end of the hub and projects radially outwardly therefrom, an annular scale mounting support having a downwardly extending flange portion resting on said mounting plate and having a peripherally opening rabbet, a scale mounted in said rabbet, means to radially adjust said scale support to obtain precise concentricity thereof with respect to the axis of rotation and means to secure the scale support in fixed relation on said mounting plate.

4. The invention according to claim 1 in which an annular scale is mounted on the outer periphery of the apron of the rotary table and overlies the upper edge of the upstanding peripheral wall of said slide and sealing means are provided between the upstanding wall of said slide and said annular scale to prevent foreign matter from falling into the space confined by said peripheral wall.

5. The invention according to claim 1 in which a circular scale is fixedly mounted on said rotary table between the hub thereof and the apron with the indicia readable from the free edge ends of the hub and the apron a projector for illuminating the indicia of said scale and a reading device for projecting the image of said illuminated indicia on a screen for reading, the longitudinal slide having a scale mounted thereon and readable from the under side and the base having a scale mounted on the upper surface thereof and readable from the upper side, an illuminating and reading device for each scale mounted on the transverse slide whereby the scale on the base can be read to determine the transverse position and the scale of the longitudinal slide can be read to determine the position of the longitudinal slide.

6. The invention according to claim 1 in which the longitudinal slide is provided with a transverse passage for light, means exteriorly of said light for illuminating the scale on said rotary table, and means exteriorly of said slide for viewing the image of the illuminated portion of said scale.

7. The invention according to claim 1 in which the lower portion of the apron provides a web for gripping engagement by cooperating jaws, said slide having a jaw-receiving recess opening toward said apron, cooperating jaws in said recess for engagement with opposite surfaces of said web, spring means to separate said jaws, a shaft screw threaded into one of said jaws and rotatably and slidably mounted in the other of said jaws, cooperating shoulder means on the other of said jaws and the shaft whereby rotation of said shaft will cause clamping and unclamping action of said jaws, said jaws being confined against movement in the direction of said web by cooperating abutting surfaces on said jaws and said slide, and means outwardly of said slide for operating said shaft.

8. A mounting for a circular scale to assure accurate concentric relation comprising a mounting washer for securement to the end of a hub, an annular circular scale mounting support having a flange loosely surrounding the hub and abutting the mounting washer, means on the flange for engaging the hub for radially adjusting the position of the support, and means to mount an accurately divided circular scale on said circular scale support whereby great accuracy in angular readings will be obtained at all times.

9. A bearing arrangement for a rotary table to assure accurate support during rotation of the rotary table about its axis, comprising a base having an upstanding boss provided with a bore and upper and lower rabbets defining upper and lower shoulders, a flanged bearing sleeve mounted in the bore of said boss with the flange in the upper rabbet and the unflanged end of the bearing sleeve projecting below the lower rabbet, a pivot member having a radially extending flange intermediate its ends rotatably mounted in said bushing with the flange of the pivot adjacent the flange of the bearing, a spacing thrust washer between said flanges, antifriction thrust bearing means on the lower end of said bushing and in the lower rabbet in said boss, and a cap fixed to the pivot and maintaining said pivot against axial movement, a rotary table mounted on said pivot member and having a peripheral rabbet opening outwardly and downwardly, said base having a peripheral cooperating rotary rabbet opening upwardly and inwardly with both of said rabbets being concentric with said pivot, a ball supporting ring in the rabbet on said base and ball bearings received between said rabbets and supported on said ring in said rabbet on said base, said pivot structure assuring accurate support during rotary movement of said rotary table.

10. A rotary work supporting table for accurate angular positioning comprising a base having a light passage extending completely therethrough, a rotary table positioned above said light passage and mounted on said base, said rotary table having downwardly opening annular recess formed therein, a circular scale accurately mounted within said recess on said rotary table, a source of light mounted on said base and outwardly of said base at one end of said light passage, a reading device mounted on said base at the other end of said light passage and having a portion in alignment with said light transmitting passage, said reading device having an objective lens and condenser lenses and a screen whereby a reading on said scale will be reproduced on said screen, said light producing illumination of said scale, and means to adjust a zero positioning slide to provide for accurate reading on said scale.

11. A clamp to maintain a rotary table in a fixed adjusted position in which the rotary table is mounted on a base and said rotary table is provided with a web to be clamped, said base having a clamp jaw receiving means open toward said web, a pair of clamping jaws movably mounted in said recess in said base with the jaws on opposite sides of said web, means to prevent movement of said jaws along said web relative to said base, an operating shaft rotatably mounted in said base and said jaws and connected by force multiplying means to one of said jaws and slidably connected to the other of said jaws, shoulder means on said shaft and said other jaw whereby rotation of said shaft will cause said jaws to be moved together, and means exteriorly of said base for rotating said shaft.

12. A clamp to maintain a machine element in fixed adjusted positions relative to a base in which the element is mounted, one of said base and elements being provided with a web to be clamped, the other of said base and element being provided with a clamp jaw receiving recess open toward said web, a pair of clamping jaws movably mounted in said recess with the jaws on opposite sides of said web, means to prevent movement of said jaws along said web relative to said base, an operating shaft rotatably mounted in said other of said base and element and threaded into one of said jaws and slidably and rotatably connected to the other of said jaws, shoulder means on said shaft and said other jaw whereby rotation of said shaft will cause said jaws to be moved together, and means exteriorly of said other of said base and element for rotating said shaft.

13. The invention according to claim 1 in which an annular scale is mounted on the outer periphery of the apron of the rotary table and overlies the upper edge of the upstanding peripheral wall of said slide and the annular scale is adjustably mounted for angular adjustment with respect to the rotary table.

14. The invention according to claim 13 in which a pair of means spaced in opposite directions from the zero scale reading and reacting between the scale and the rotary table providing for adjustment between the scale and rotary table and retention of the scale in adjusted position.

15. A rotary work table comprising a base having an upstanding tubular boss and an upstanding peripheral wall substantially concentric with said upstanding boss and projecting upwardly from said base, a flanged pivot member rotatably mounted in said boss and having its flange extending outwardly and overlying said boss, a thrust washer between the flange of said bushing and said boss, a circular table having a downwardly extending hollow central hub, said rotatable table having an inwardly extending central portion overlying and secured to the flange of said pivot member, a thrust washer mounted on the lower end of said bushing and adjacent a shoulder at the lower end of said boss and secured to the pivot member by a thrust-receiving cap thereby maintaining the rotary table against axial displacement, cooperating rabbets on the upstanding peripheral wall of said base and the periphery of said circular table, ball bearings cooperating with said cooperating rabbets for supporting the outer periphery of said circular table whereby said circular table will be completely supported at its center and its periphery, and means to rotate said table.

16. A rotary table for a jig borer comprising a base having an upstanding boss therein, a rotary table having a hub rotatably mounted on said boss for rotation about the axis of said boss and hub, said base and boss having intersecting axial and diametrical bores through which light will pass diametrically through said axis, a source of light at one end of the diametrical bore, a circular scale mounted on said hub of said rotary table and lying between said hub and the outer periphery of said rotary table and appreciably spaced inwardly of said outer periphery, and a scale reading device at the other end of said diametrical bore, said structure assuring accurate reading of said scale regardless of the location of the table relative to said base.

17. A clamp structure for assuring non-influencing clamping action between a flange of a movable element and a base on which said movable element is mounted comprising a pair of jaws, a shaft having screw threads along one portion thereof and a shoulder on another portion thereof rotatably mounted on said base and axially movable along its axis on said base with said axis being transverse to said flange of said movable element, one of said jaws being provided with a screw threaded bore receiving the portion of said shaft having screw threads and the other jaw freely slidably and freely rotatably receiving another portion of said shaft and being engageable with the shoulder on the said another portion of said shaft, whereby rotation of said clamping shaft will cause relative movement of said jaws, and means to accurately guide said jaws in said base against movement along said flange whereby said clamp structure provides for controlled clamping action of the jaws on said flange assuring that the parts will be non-influenced by the action of the clamping jaws.

References Cited in the file of this patent

UNITED STATES PATENTS 638,695 Beeley _____ Dec. 12, 1899

FOREIGN PATENTS 644,233 France _____ June 4, 1928
213,962 Switzerland _____ June 16, 1941